(No Model.)

R. VON NAGY DE MARKOVITZ.
ICE CYCLE.

No. 591,990. Patented Oct. 19, 1897.

Witnesses
A. G. Reese
L. Della McGirr

Inventor
Rosa von Nagy de Markovitz
by Leonard Huntress Dyer
Attorney

UNITED STATES PATENT OFFICE.

ROSA VON NAGY DE MARKOVITZ, OF BUDA-PESTH, AUSTRIA-HUNGARY.

ICE-CYCLE.

SPECIFICATION forming part of Letters Patent No. 591,990, dated October 19, 1897.

Application filed January 21, 1897. Serial No. 620,154. (No model.)

*To all whom it may concern:*

Be it known that I, ROSA VON NAGY DE MARKOVITZ, gentlewoman, a subject of the King of Austria-Hungary, residing at No. 8 Szaboky Gasse, Buda-Pesth, in the Kingdom of Austria-Hungary, have invented new and useful Improvements in Ice-Cycles, of which the following is a full, clear, and exact description.

This invention relates to an improved device applied to bicycles for adapting the same to be ridden easily on the ice.

Figure 1:
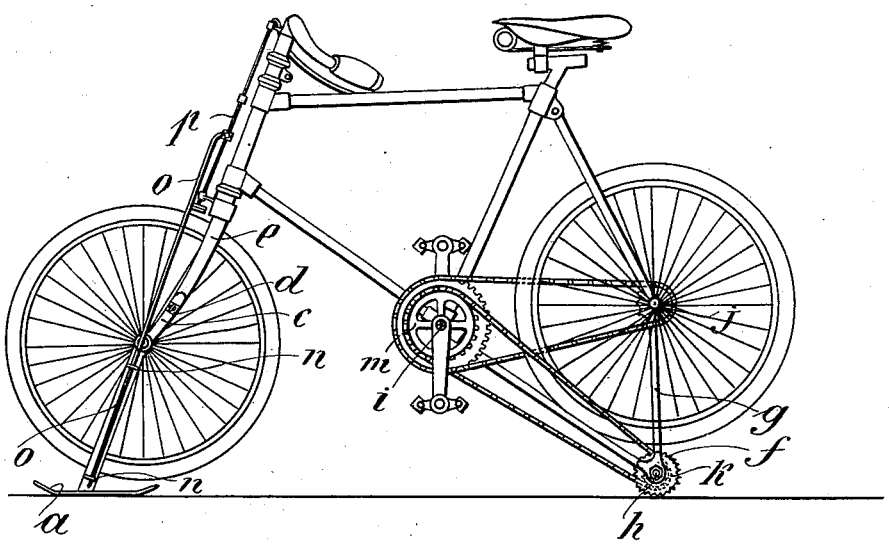
Figure 2:
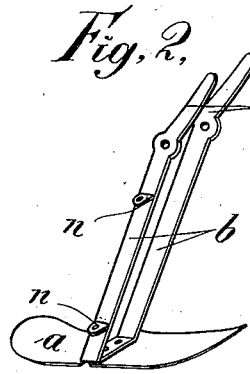
Figure 3:
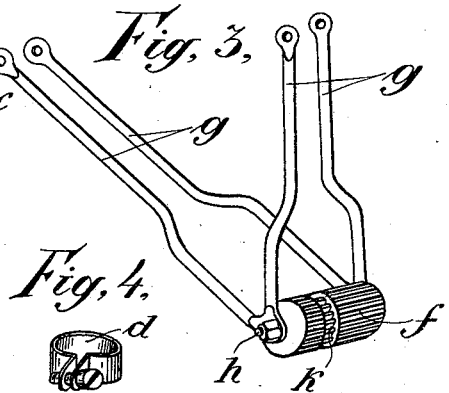
Figure 4:

On the accompanying drawings, Figure 1 is a side view of a bicycle provided with this improved device. Figs. 2, 3, and 4 are perspective views of parts of same.

The broad runner $a$, Fig. 2, is secured to the axle of the front wheel by means of two rods or supports $b$, which inclose the front wheel and are rigidly secured to the ends of the axle, whereas arms $c$ of same extending above are secured to the fork $e$ of the wheel by means of suitable clamps $d$, Fig. 4. The rods $b$ are of such a length that the runner $a$, which is rigidly secured thereto, does not come in contact with the wheel and the latter stands off the ice.

Below the rear wheel a broad fluted or roughened roller $f$ is rotatably mounted on an axle $h$, mounted in the bell-crank levers $g$, which are secured with their free ends to the ends of the crank-axles $i$ and of the axle $j$ of the rear wheel, respectively. The fluted roller $f$ is provided or formed with a chain-wheel $k$, which is in engagement with the driving-chain $l$, gearing also with a chain-wheel $m$, which is keyed onto the crank-axle $i$, so that on treading the cranks the roller $f$ is rotated, which causes the cycle to move on the ice. In order to retard or stop the movement of the cycle on the ice, the supports $b$ of the runner are provided with a rod $o$, which is guided in lateral eyelets $n$ of the supports $b$. This rod $o$ is connected with the brake-rod $p$ of the cycle, so that on operating the brake-handle the rod $o$ pierces with its lower point into the ice and thus retards or stops the movement of the cycle.

Having now particularly described and ascertained the nature of my said invention, I declare that what I claim, and wish to secure by Letters Patent, is—

In a bicycle, the combination with the front wheel of a runner secured to the axle by means of rods or supports which are detachably secured to same and with the rear wheel of a fluted roller adapted to be rotated by means of a chain running from a chain-wheel of the crank-axle, such roller being supported by a pair of rods also detachably connected with the crank axle and spindle of the driving-wheel respectively for the purpose of enabling the bicycle to be safely ridden on the ice, substantially as described and shown.

In witness whereof I have hereunto signed my name in the presence of two subscribing witnesses.

ROSA VON NAGY DE MARKOVITZ.

Witnesses:
ARTHUR BAERMANN,
GUSTAV TANER.